Patented June 27, 1950

2,512,761

UNITED STATES PATENT OFFICE 2,512,761

ELECTRIC GLASS FURNACE

Pierre Arbeit, Paris, France, assignor to Societe Anonyme des Manufactures des Glaces et Produits Chimiques de Saint-Gobain, Chauny & Cirey, Paris, France Application August 5, 1947, Serial No. 766,277
In France January 16, 1946

Section 1, Public Law 690, August 8, 1946
Patent expires January 16, 1966

10 Claims. (Cl. 13—6)

This invention relates to glass making and has particular relation to improvements in the manufacture of glass by a continuous process in which the glass undergoes in sequence the melting of the raw materials, the fining of the melt, and the cooling of the very hot fined glass to a temperature suitable for working. A particularly valuable phase of the invention is related to glass furnaces of electric type wherein heating current is introduced within the body of the glass by electrodes of Joule effect type.

The present invention will be described in connection with the improvement of a standard continuous process in which, as is known, the material to be treated is charged at one end of the furnace and removed at the other in the form of molten finished glass, being subjected successively in its passage through the furnace to the operations of fusion, fining, and of cooling toward a working temperature. The furnaces that carry out this preparation of the glass generally include three zones roughly corresponding to the three said phases of manufacture. Frequently, some of the zones are combined, but in the more modern furnaces barriers have been erected in an attempt to isolate the three steps of the process. Nevertheless, it has been difficult to control the temperature at which the glass is received in the working zone or to insure the dissolving of small glass bubbles that do not escape from the fined glass before the solidification of the glass in the form of an object.

The operation of cooling, also called conditioning, has as an object to bring the glass from the very high fining temperature at which it is very fluid to a lower working temperature at which the glass may be conveniently employed in the fashioning of objects. It also has as an object to dissolve the small gas bubbles that have not escaped during fining. It has been desirable that the machines which shape the glass articles should be fed by glass at uniform temperature. However, heretofore these conditions have not been attained perfectly or continuously, and when attained at all, have been attained only imperfectly or with very great difficulty and by the use of compartments of large size and at the cost of maintaining, at high temperature, larger bodies of glass than are needed for the normal operation of the machines. The absorption of bubbles has been attained only by keeping the glass in the fining tank for a long period of time so that the convection currents will eventually lead to the homogenization of the glass and the absorption of the bubbles.

It is an object of this invention to produce more homogeneous glass.

Another object is to provide for the absorption and solution of small bubbles into fined glass so as to produce a bubble-free product.

Another object is to eliminate or materially reduce wandering glass currents.

Another object is to employ the convection currents arising from differences in temperature in the glass in combination with new furnace structure to attain useful ends, for instance to facilitate the transfer of glass from step to step of the process.

Another object is to reduce the size of the chambers in a glass furnace.

Another object is to reduce the cost of heating by reducing the masses of the glass subjected to heating and by reducing the time of heating.

Another object is to employ electrical heating by submerged electrodes to facilitate the other objects of the invention and to acquire a new and more perfect continuous process of making glass.

The objects of the invention are accomplished, generally speaking, by a process that includes forming a fining pool of molten glass, fining the glass in the fining pool, withdrawing fined glass from the fining pool to the upper part of a settling pool, allowing the withdrawn glass to settle and cool in the settling pool until gas bubbles have been absorbed and the temperature of the glass is right for working, and withdrawing glass from the settling pool to a working pool. The new furnace involves a chamber in which the fining of the glass occurs, a working chamber, and between them a separate settling chamber that is connected to the fining chamber by a passage at the upper part of the settling chamber, and to the working chamber by a passage at the lower part of the settling chamber.

Under such conditions it has been proved that the cooling of the glass is uniformly effectuated without the need of giving large dimensions to the compartment, and this permits in consequence to obtain a cooling that is both uniform and quick.

This result might be explained by the fact that the glass, when it is cooled, tends to descend and consequently tends of itself both to withdraw from the orifice of entry and to approach the orifice of discharge from the compartment, but it does not reach the orifice of discharge except as it becomes sufficiently cool and at the same temperature as the glass which has already gathered before this orifice. In other words, the process tends to give automatically to the glass the same temperature in every horizontal plane without the help of vertical movements due to convection, movements which are produced in the usual installations and which are otherwise indispensable for the making of homogeneous glass by a kind of working, but which are naturally difficult to control. There is no longer danger that there will be set up across the conditioning zone currents of hotter glass capable of establishing differences in temperature in the glass that issues, as is the case in prior art installations where, as is known, the glass enters the lower part and issues from the upper part. Furthermore, there is no longer danger that cool glass, having traversed the whole conditioning zone and having arrived at a proper temperature before the outlet orifice, will return into the fining zone because that would require the cold glass to rise in the conditioning compartment and repass the orifice by which it entered the compartment. There is thus prevented a movement of the glass which would have for its consequence to increase the quantity of glass that passes from the fining compartment into that of conditioning and to require of the latter to cool more glass than is necessary to feed the manufacturing machines. It should be understood that in practice the conditioning compartment conforming to the invention might be associated with auxiliary compartments interposed between that compartment and the compartment which precedes it and the compartment which follows it; that is to say, the fining compartment and the one from which the glass is withdrawn. Such auxiliary compartments might be necessary in effect in order to associate the conditioning compartment contemplated by the invention with the different types of fining compartments or of working compartments. The essential is that, after fining, the cooling of the glass should take place in larger part in a compartment designed in conformity with the principles of the invention. Different ways of accomplishing the invention are given hereafter by way of non-limitative examples, reference being had to the attached drawings which represent:

Figure 1:
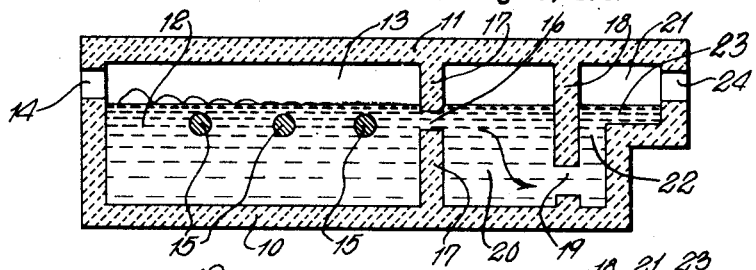
Fig. 1 is a schematic vertical longitudinal section through that portion of a glass furnace that includes a new settling chamber.

In the furnace illustrated in Fig. 1 the numeral 10 indicates the tank in which the operations of melting, fining, settling, and working occur. The numeral 11 shows the dome of the furnace. It is to be presumed that this furnace is constructed in a normal manner so far as the materials of its construction are concerned. At one end of this furnace is a melting zone 12, a fining zone 13 and a port for the admittance of materials 14. Heating is accomplished in this instance by resistors 15 which are submerged in the glass at a level related to that of an orifice 16 provided in a baffle 17 that extends across the furnace and separates the two zones 12, 13 from the settling pool that is established between the baffle 17 and the baffle 18. The orifice 16 which gives admittance to the fined glass from the fining pool is near the top of the settling pool in the form of Fig. 1, but the orifice 16 is completely submerged. The baffle 18 has an orifice 19 that is near the bottom of the settling pool 20. Thus the hot fined glass enters at the top of the settling pool and is cooled as it sinks in the pool until it approaches an ideal working temperature as it passes through the orifice 19. The working compartment 21 has a kind of narrow passage or flue 22 through which the glass passing orifice 19 makes its way into the pool 23 from which the glass is withdrawn for shaping. This flue may be used if desired to cool, still further, the glass from the temperature at which it passes through orifice 19. It is advantageous generally speaking to construct and arrange the walls of the compartment containing pool 20 in such manner that in any one horizontal plane the four walls of the compartment exercise a like cooling effect upon the glass.

It is particularly to be noted, and this forms a part of the present invention, that the wall 17 is between the very hot glass of the fining compartment and the cooler glass of the settling compartment, which would tend to make this wall hotter than the other walls of the settling chamber. This problem has been solved by the conceptions of Fig. 2. In that figure the construction of the furnace is similar to Fig. 1 except that the wall 17' that separates the melting-fining compartment from the settling compartment extends upwardly from the bottom of the furnace to a position just below the level of the glass, so that a shallow channel exists between the fining and settling compartments through which the glass passes from the top of the one to the top of the other at the rate provided by the withdrawal of the glass through the discharge port 24. The three electrodes 15a, 15b, 15c are so arranged, across the melting-fining compartment, that they constitute a barrier to the passage of unmelted particles and of unfined glass toward the channel above wall 17'. The very hot fined glass moving from the vicinity of electrode 15c passes over the wall 17' to the top of the settling chamber and slowly sinks as it cools through the chamber until it passes through the orifice 19 into the flue 22.

Figure 2:
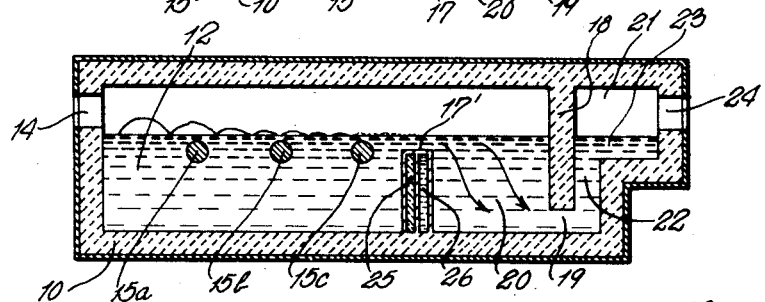
Fig. 2 is a similar section through a furnace employing a single melting-fining compartment in combination with the new settling compartment.

In Fig. 2 another difference appears in that wall 17' is hollow and is provided on the side of the fining chamber with heat insulation 25 and on the side of the setting chamber with a water jacket 26 through which cooling water at selected temperature may be passed in order to prevent the glass in the settling chamber, in the vicinity of the wall, from being kept at too high a temperature to serve satifactorily in the working chamber.

Figure 3:
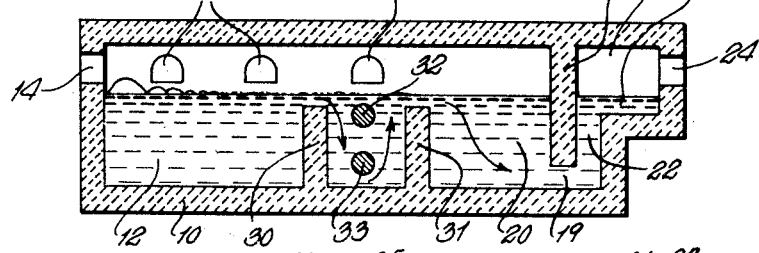
Fig. 3 is a similar section through a furnace having a separate fining compartment in which heating is accomplished by a combination of flame and electricity.

In the structure of Fig. 3 two walls 30, 31 isolate the fining chamber from the melting chamber to the left and the settling chamber to the right. Between these two walls are located two electrodes 32, 33 which may be of Joule effect type if desired. These electrodes are sufficiently spaced from the walls of the furnace so that the relatively cool unfined glass coming from the compartment 12 over the wall 30 tends because of increasing density as it cools to sink to the bottom of the compartment, whereas the hot currents rise about and particularly toward the right side of the electrodes attaining a very high temperature as they ascend and ridding themselves of the major portion of their occluded gases which leave the surface of the very fluid glass in bubbles. The superimposed relation of the electrodes, which may be as many in number as desired, tends to produce a superheating of the process which is quite beneficial at this stage. This very hot glass passes over the barrier 31 at the rate provided by the withdrawal of glass through the port 24 to the top of the settling chamber in which it descends at the rate provided by the size of the chamber and the rate of withdrawal through port 24 until it reaches the bottom. During its settling and passage through the settling chamber, the glass cools and the fine bubbles that were not liberated in the fining chamber are dissolved in the glass, providing a glass at the entrance to the working chamber that is bubble-free. The arrows indicate the approximate path of the glass currents through the fining compartment. In this form of the invention the heating of compartment 12 is by gas flame burners 34. In addition, the surface of the glass in the fining chamber is also heated by a flame burner 35.

Figure 4:
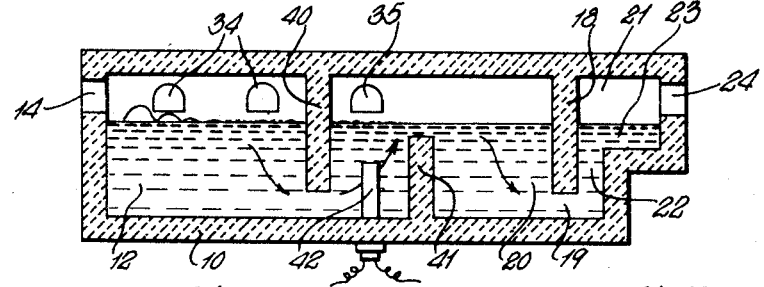
Fig. 4 is illustrative, by a similar section, of a furnace having advanced control of glass currents.

In the structure described in Fig. 4 the tank is provided with a depending barrier 40 and an upwardly projecting barrier 41. The depending barrier terminates short of the bottom of the furnace so that a passage exists through which glass from the melting chamber may pass to the fining chamber. With the fining chamber are electrodes 42 operating by Joule effect which project vertically through the bottom into and beneath the surface of the glass in the fining chamber. These electrodes initiate currents of very hot glass that ascend toward the top of the fining chamber, are prevented from returning to the melting chamber by the baffle 40, and flow over the top of the submerged baffle 41 into the settling chamber 20. The arrows indicate the general course of the glass flow through the several chambers, and it will be observed from the arrangement and construction of these chambers that there will be a marked reduction in the flow of uncontrolled convection currents throughout the furnace.

Figure 5:
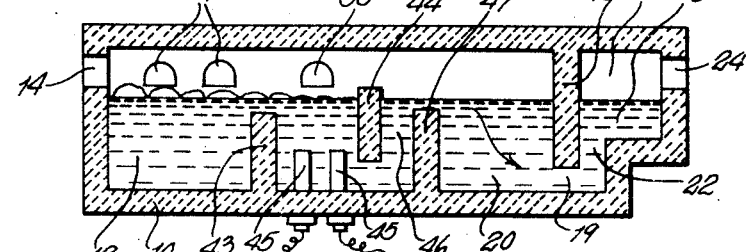
Fig. 5 is a similar section through a furnace of further modified form.

In Fig. 5 the melting chamber 12 is separated from the fining chamber by means of a baffle 43 which projects upward from the bottom of the tank and has a shallow channel through which the glass from the melting compartment may flow to the top of the fining compartment. A depending baffle 44 projects downwardly from above the level of the glass in the fining chamber to a position toward the bottom thereof. Between these two baffles are located electrodes 45 operating by Joule effect which subject the glass in the fining compartment to high temperature. The currents from these electrodes ascend into the space between baffles 43 and 44 so that the glass between those baffles is subjected to a continuous working by high temperature convection currents. The glass is withdrawn from the fining compartment beneath the baffle 44 and enters a kind of flue 46 provided between baffle 44 and a baffle 47 projecting upwardly from the bottom of the furnace to a position beneath the level of the glass. The fined glass taken from the fining compartment passes through the flue 46 and over the baffle 47 to the top of the settling chamber 20 wherein it is progressively cooled as it settles and absorbs tiny bubbles that did not escape during the previous steps of the process.

It is generally to be noted that the glass which is admitted to the compartment 20 is taken directly from the surface of the fining compartment, that is, from the level where the largest gas bubbles escape and from which the cooling and the absorption of little bubbles should commence. In other terms, the major part, if not the entirety of the cooling from the temperature of fining is effectuated in the conditioning chamber, under conditions of stability conducive to the attainment of a superior result.

It is to be noted that the types of furnace such as those represented in Figs. 3, 4, and 5 in which the heating is made simultaneously by flame burners and by electric current in the mass of glass lend themselves particularly well to the accomplishment of the process, which lies in accomplishing by heating means exterior to the glass such as by flame burners a heating which is simply adapted to attain as well in the compartment of fusion as in that of fining a relatively low temperature in the neighborhood of the temperature of conditioning, while there is established in the fining compartment within the body of the mass of glass, by the passage of electric current, the higher temperature necessary to complete the fusion and to obtain the fining.

It should be understood that it is not excluded from the spirit of the invention to employ in the conditioning compartment auxiliary heating means such as flame burners, radiant heaters and electric current in the glass to assist in regularizing the attainment of a good glass temperature. Similarly, heating means may be added to the compartment 23 to produce certain local effects used in different types of glass manufacture.

The invention contemplates:

1. A continuous process for making glass in accordance with which glass is made to pass successively through different compartments where fusion, fining, conditioning, or cooling are accomplished, the process lying in conditioning the glass in a compartment in which the glass at high temperature which issues from the fining compartment enters the upper part and issues from the lower part.

2. Furnaces for the accomplishment of the process following (1) characterized by the following points taken separately or in combination:

a. The glass passes from the fining compartment to the conditioning compartment by a channel which connects the two compartments in the upper part of the bath.

b. After conditioning the glass enters the compartment of withdrawal through a vertical conduit of small section, which it enters from the lower part of the conditioning compartment.

c. The conditioning compartment is associated with a fusion and fining compartment heated by the passage of an electric current introduced by horizontal electrodes localized in the upper part of the bath.

d. The conditioning compartment is associated with a fining compartment which communicates with the compartment of fusion by a channel in the neighborhood of the surface of the bath and which is heated by the passage of an electric current introduced by horizontal electrodes some of which are situated above others above the depths and near the surface of the bath.

e. The conditioning compartment is associated with a fining compartment which communicates with the fusion compartment through the lower part of the bath and which is heated by the passage of the electric current introduced by vertical electrodes passing through the bottom of the compartment into contact with the lower part of the bath.

*f*. The conditioning compartment is associated with a fining compartment which communicates with the fusion compartment through the upper part of the bath and which is heated by the passage of electric current introduced by electrodes vertically localized in the lower part of the bath, a transverse wall being provided in the fining compartment on the side from which the glass discharges, to constitute a kind of vertical conduit taking the glass from the lower part of the fining compartment to lead it to the upper part of a conditioning compartment.

As many apparently widely different embodiments of the present invention may be made without departing from the spirit and scope thereof, it is to be understood that the invention is not limited to the specific embodiments, except as defined in the appended claims.

What is claimed is:

1. The process of glassmaking that includes the steps of establishing separated fining, settling, and working pools of molten glass having a common surface level, electrically heating substantially the entire width of the upper level of the glass in the fining pool, said fining pool discharging from its upper level horizontally to the upper level of the settling pool, said settling pool discharging from its lower level, with a change of direction, substantially vertically to the working pool.

2. The process according to claim 1 in which the glass discharged to the settling pool is taken from beneath the surface of the fining pool.

3. The process according to claim 1 in which the glass discharged to the settling pool is taken from the surface of the fining pool.

4. The process according to claim 1 in which a stream of glass is taken from the bottom of the fining pool, moved vertically, and discharged horizontally to the top of the settling pool.

5. A glass furnace including a chamber in which occurs the fining of glass and comprising electrical means for the heating of the glass bath, a separate settling chamber connected to the said chamber by a passage extending from the upper level of the glass in the fining chamber into the upper level of the glass in the settling chamber, and a separate working chamber connected to the settling chamber through a vertical passage issuing from the lower part of the settling chamber, the structural relationship of the chambers and passages comprising means to provide a common glass surface level throughout the furnace.

6. The furnace of claim 5 in which the upper passage is wholly submerged.

7. The furnace of claim 5 in which the upper passage is open.

8. The furnace of claim 5 in which the settling chamber is separated from the upstream zones by a wall arising from the bottom almost to the surface of the glass, and a dipping bridge wall extends therebefore from above the surface almost to the bottom, whereby fined glass passes horizontally beneath the bridge wall, vertically between the walls, and is horizontally discharged over the settling chamber wall to the top of the settling chamber.

9. The furnace of claim 5 in which at least a submerged electrode in the upper part of the fining chamber acts as a barrier to the travel of unfined glass toward the passage opening into the settling chamber.

10. The furnace of claim 5 in which the fining chamber is electrically heated by means of submerged vertical electrodes penetrating through its bottom wall.

PIERRE ARBEIT.

REFERENCES CITED

The following references are of record in the file of this patent:

UNITED STATES PATENTS

| Number | Name | Date |
| --- | --- | --- |
| Re. 12,323 | Richardson | Feb. 28, 1905 |
| 246,109 | Fetters | Aug. 23, 1881 |
| 972,778 | Sauvageon | Oct. 11, 1910 |
| 1,552,555 | Gravel | Sept. 8, 1925 |
| 1,593,054 | Arbeit | July 20, 1926 |
| 1,611,328 | Arbogast | Dec. 21, 1926 |
| 1,656,510 | Cornelius | Jan. 17, 1928 |
| 1,820,248 | Raeder | Aug. 25, 1931 |
| 1,880,541 | Wadman | Oct. 4, 1932 |
| 1,905,534 | Wadman | Apr. 25, 1933 |
| 1,944,855 | Wadman | Jan. 23, 1934 |
| 2,068,925 | Mulholland | Jan. 26, 1937 |
| 2,277,678 | Borel | Mar. 31, 1942 |
| 2,283,188 | Cornelius | May 19, 1942 |
| 2,283,800 | Ferguson | May 19, 1942 |
| 2,397,852 | Gentil | Apr. 2, 1946 |
| 2,413,037 | De Voe | Dec. 24, 1946 |

FOREIGN PATENTS

| Number | Country | Date |
| --- | --- | --- |
| 250,536 | Great Britain | July 29, 1926 |

Certificate of Correction

Patent No. 2,512,761 June 27, 1950

PIERRE ARBEIT

It is hereby certified that error appears in the printed specification of the above numbered patent requiring correction as follows:

Column 5, line 33, for the word "With" read *Within*;

and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*